UNITED STATES PATENT OFFICE.

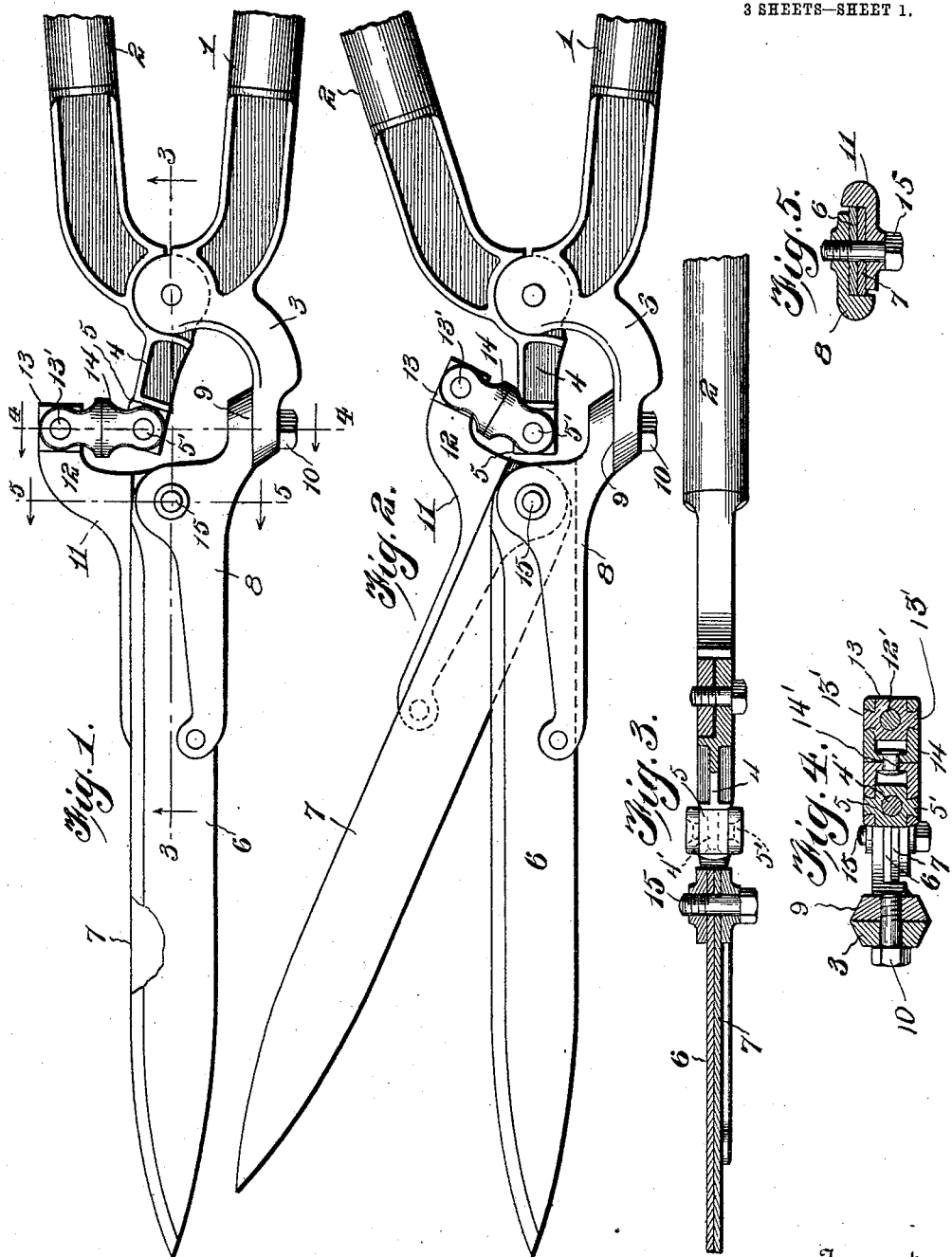

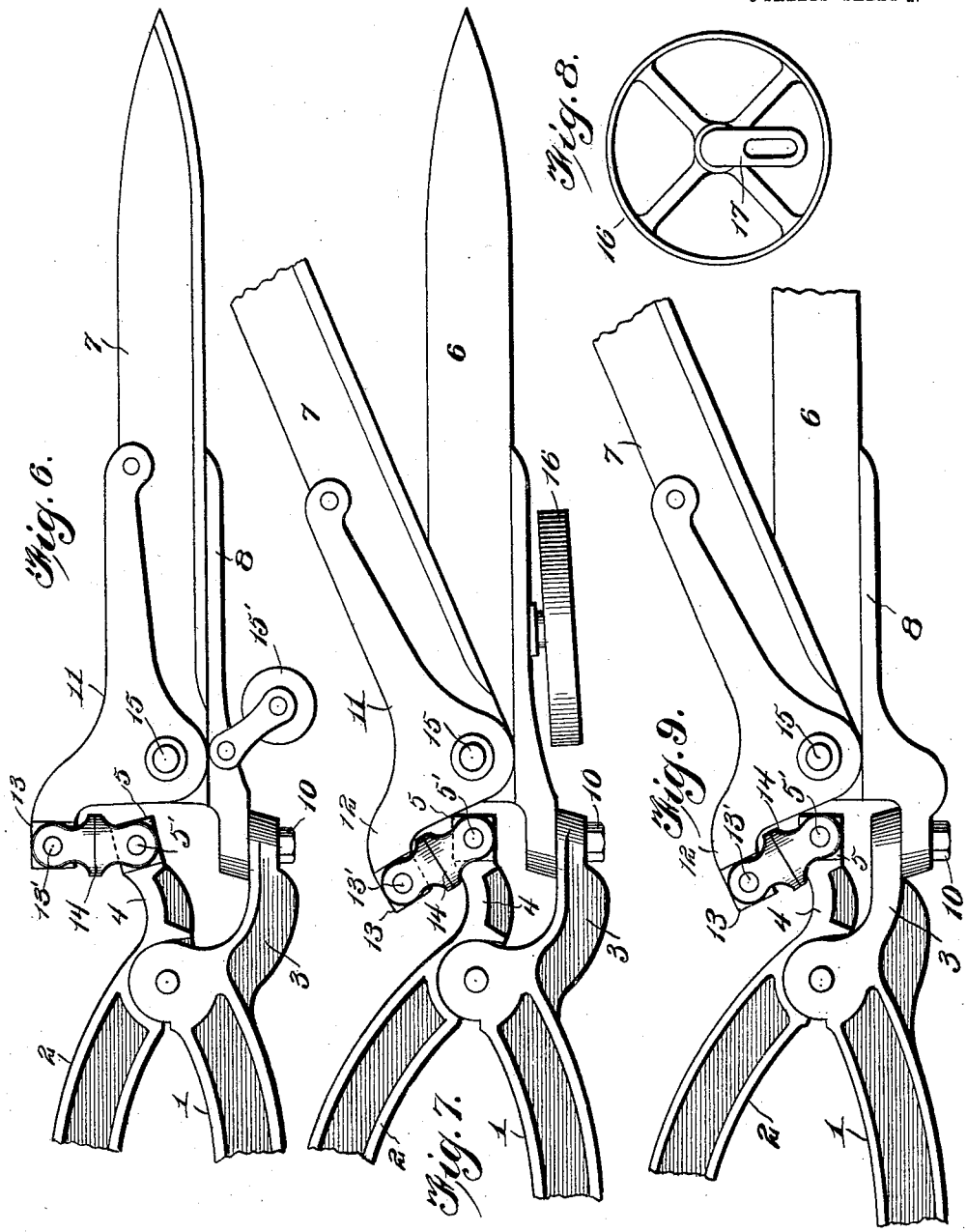

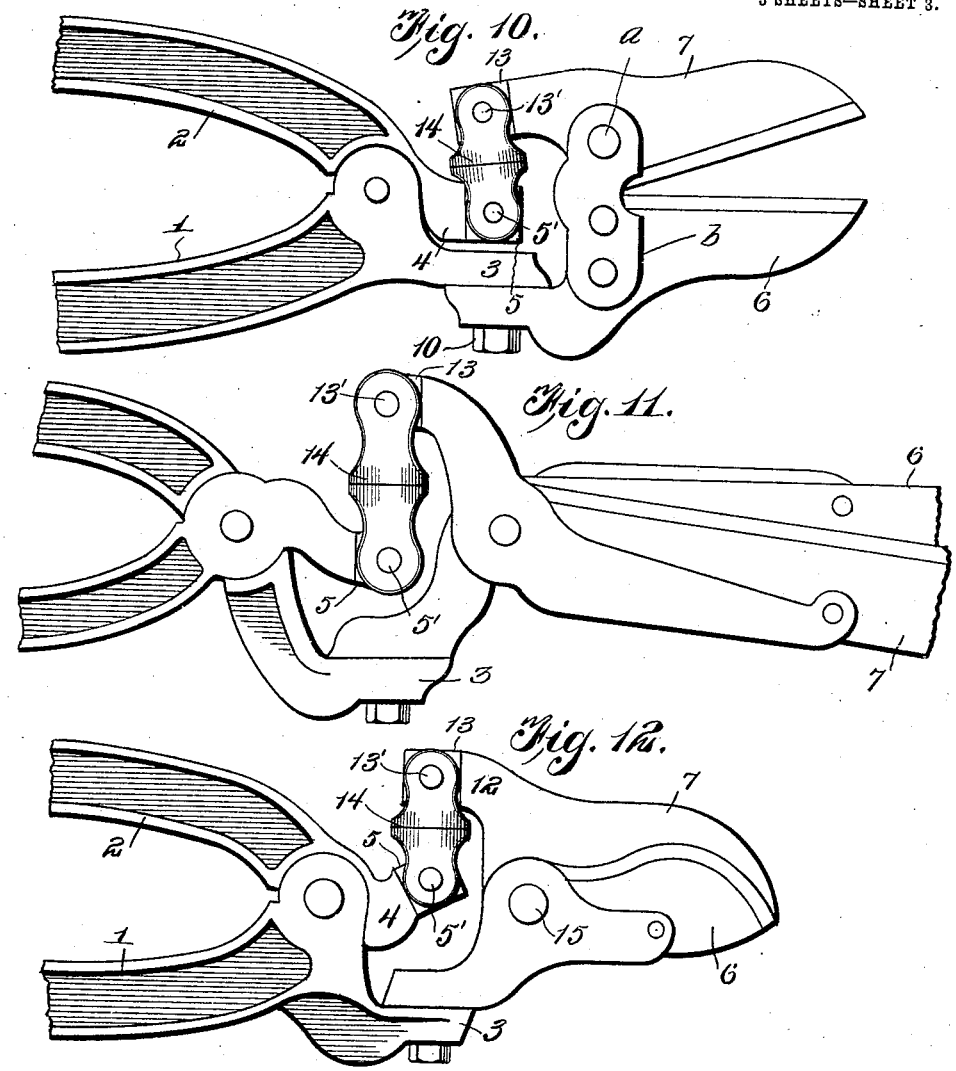

JOHN M. SWEET, OF BATAVIA, AND THOMAS JAMES CLARKE, OF JAMESTOWN, NEW YORK.

SHEARS.

No. 910,607.  Specification of Letters Patent.  Patented Jan. 26, 1909.

Application filed December 26, 1907. Serial No. 408,095.

*To all whom it may concern:*

Be it known that we, JOHN M. SWEET, a citizen of the United States, residing at Batavia, county of Genesee, State of New York, and THOMAS JAMES CLARKE, a citizen of the United States, residing at Jamestown, in the county of Chautauqua and State of New York, have invented certain new and useful Improvements in Shears; and we do declare the following to be a full, clear, and exact description of the invention, such as will enable others skilled in the art to which it appertains to make and use the same.

This invention relates to new and useful improvements in shears designed for the cutting of wire, paper, tin or other sheet metal, grass or any other article which it is desired to cut, the shears being of such construction that they may be operated while the operator is in standing or erect position.

A further object of the invention is to so connect the cutting blades with the handle members that the former may be adjusted laterally to enable the operator to cut objects disposed at different angles from where he is standing.

With this and other objects in view the invention consists of certain novel features of construction, combination and arrangement of parts, as will be more fully described and particularly pointed out in the appended claims.

In the accompanying drawings, Figure 1 represents a view in side elevation of a pair of shears constructed in accordance with the invention, with parts broken away; Fig. 2 is a similar view with the pivoted cutting blade in cutting position; Fig. 3 is a longitudinal section taken on the line 3—3 of Fig. 1; Fig. 4 is a cross section taken on the line 4—4 of Fig. 1; Fig. 5 is a similar view taken on the line 5—5 of Fig. 1; Figs. 6 and 7 represent views in side elevation of slightly modified forms of the invention; Fig. 8 represents a side elevation of a modified form of supporting wheel which may be employed in connection with the form of invention illustrated in Fig. 7; Figs. 9 to 12 inclusive, are similar views of other modified forms of the invention.

In the embodiment illustrated, the numerals 1 and 2 indicate the handle members of the shears, the former of which always remains in a stationary position with respect to the other handle member during the operation of the device and for this reason shall be termed the stationary handle member and the latter of which is pivoted to the stationary handle member and moves relatively thereto and for this reason shall be termed the pivoted handle member.

In carrying out the invention, the stationary and pivoted handle members are provided at their inner ends with outwardly projecting portions 3 and 4 respectively, the outer end of the portion 4 terminating in a stem 4' on which is fitted a sleeve 5 formed at opposite points with laterally and oppositely projecting lugs 5' the purpose of which will be described.

The numerals 6 and 7 indicate the cutting blades, the former of which always remains in a stationary position with respect to the other blade, and for this reason shall be termed the stationary cutting blade and the latter is pivoted to the stationary blade and moves relatively thereto during the operation of the device, and for this reason shall be termed the pivoted cutting blade. A supporting member 8 preferably in the form of a plate, is fixed to the inner end of the stationary cutting blade, the inner end of the supporting member terminating in a bearing portion 9, which bears upon the outwardly projecting portion 3 of the stationary handle member and is connected therewith by a bolt 10, which extends through the outer end of the portion 3 and screws into said bearing portion 9. By connecting the relatively stationary cutting blade with the stationary handle member 1 in the manner above described, the same may be adjusted laterally at any desired angle with the handle members after first partly unscrewing the bolt from position, and may be held in adjusted position by again screwing the bolt in place. A supporting member 11, also preferably in the form of a plate, is fixed to the inner end of the pivoted blade 7, and is provided with an inwardly extending extension 12, the outer end of which is formed with a reduced portion or stem 12' on which is fitted a sleeve 13 formed at opposite points with laterally and oppositely extending lugs 13'.

A joint 14, preferably of universal type, and comprising two corresponding sections connected by a rivet 14', is connected at opposite ends with the lugs of the sleeve 5 and 13 respectively, and serves as a connection between the pivoted cutting blade 7 and pivoted handle member 2. It will be evident that by connecting said last mentioned cutting blade and handle member in the manner shown and described the former is permitted to swing in a lateral plane during the operation of adjusting the stationary cutting blade 6.

In the modified form of the invention illustrated in Fig. 6 the stationary cutting blade is provided with a suitable supporting wheel 15' so that the shears may be passed over the surface with greater facility.

In the modified form of the invention illustrated in Fig. 7 the supporting wheel 16 is journaled to the outer edge of the stationary cutting blade. By this arrangement when the shears are employed for cutting grass or the like it will be perceived that the cutting operation will be performed with the cutting blades the same distance from the ground at all times and the grass will be cut more evenly than would otherwise be possible. As illustrated in Fig. 8, this wheel may be formed with a depending longitudinally slotted hanger 17 by means of which the cutting blades may be arranged or adjusted to cut at different heights from the ground or other surface over which the wheel travels. Instead of arranging the outwardly projecting portion 3 of the stationary handle member to extend under the inner end of the supporting member 8 of the stationary cutting blade 6 it may be arranged to bear upon the same, as illustrated in Fig. 9.

In connection with this differentiating feature, blades of the type shown in Fig. 10 of the drawings may be used when the shears are used for cutting wire or the like, the pivoted blade being shown as pivoted to the upper end, as at $a$, of a bracket $b$ riveted or otherwise attached to one face of the stationary blade.

In the modified form of the invention illustrated in Fig. 11 the cutting blades and handle members cross or intersect each other at their pivotal points. In this form of the invention the upper blade is the stationary one and the lower blade the movable one.

In Fig. 12 of the drawings which illustrates another slightly modified form of the invention the cutting blades are of a form which especially adapts the shears for pruning and trimming purposes.

In summing up, the advantages derived from the use of our improved form of shears may be briefly enumerated as follows. First by making the handle members sufficiently long they may be operated while the operator is in a standing or erect position. In trimming lawns this feature would prove a very advantageous one. Second, the cutting blades may be adjusted laterally or at right angles with the handle members. Third, when the shears are employed for cutting grass or other like objects close to buildings, fences, or the like, the stationary blade may be placed against the object to be cut and for trimming purposes by employing the form shown in Fig. 12 and making the handles of sufficient length the cutting operation may be performed at any angle to the object to be cut and at a safe distance therefrom, avoiding danger of bringing the hands in contact with wires, thorns, sharp limbs or the like.

Having thus described our invention, what we claim as new and desire to secure by Letters-Patent is:—

1. A pair of shears comprising pivoted and stationary handle members, a pivoted cutting blade connected with the pivoted handle member and a second cutting blade connected with the stationary handle member, said last mentioned cutting blade being adapted for lateral adjustment with respect to the handle members and being stationary with respect to the pivoted cutting blade.

2. A pair of shears comprising pivoted and stationary handle members, a pivoted cutting blade, a relatively stationary laterally adjustable cutting blade connected with the stationary handle member and means for connecting the pivoted blade with the pivoted handle member whereby the former is permitted to swing in a lateral plane during the operation of adjusting the stationary blade.

3. A pair of shears comprising stationary and pivoted handle members provided at their inner ends with outwardly projecting portions, a pivoted cutting blade, a relatively stationary laterally adjustable cutting blade connected with the projecting portion of the stationary handle member and a universal joint for connecting the pivoted cutting blade with the projecting portion of the pivoted handle member.

In testimony whereof we have hereunto set our hands in presence of two subscribing witnesses.

JOHN M. SWEET.
THOMAS JAMES CLARKE.

Witnesses:
Howard A. Smith,
Richard E. Johnson.